May 31, 1932.    H. A. FOOTHORAP    1,861,210
LINE SPACE MECHANISM FOR TYPEWRITING MACHINES
Filed April 4, 1929    2 Sheets-Sheet 1
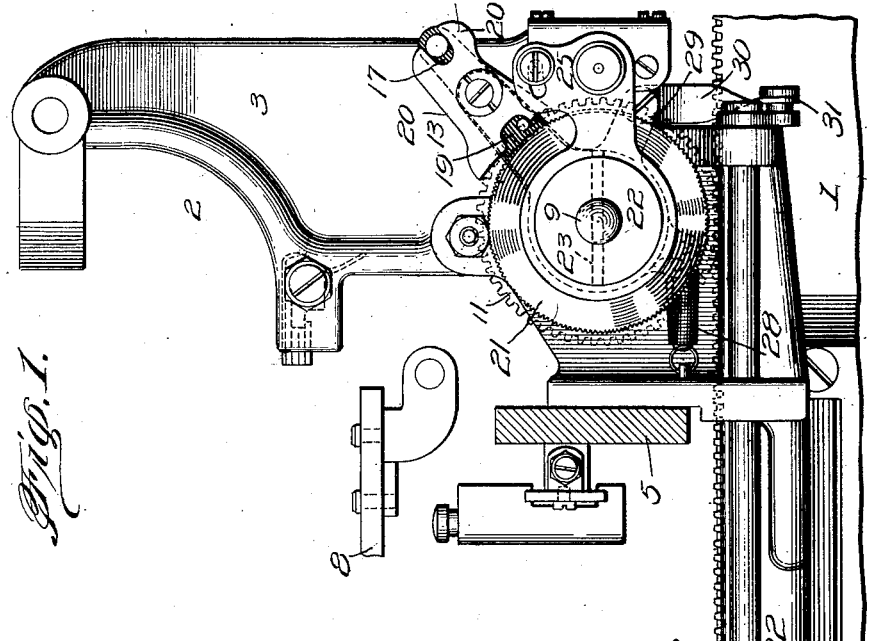
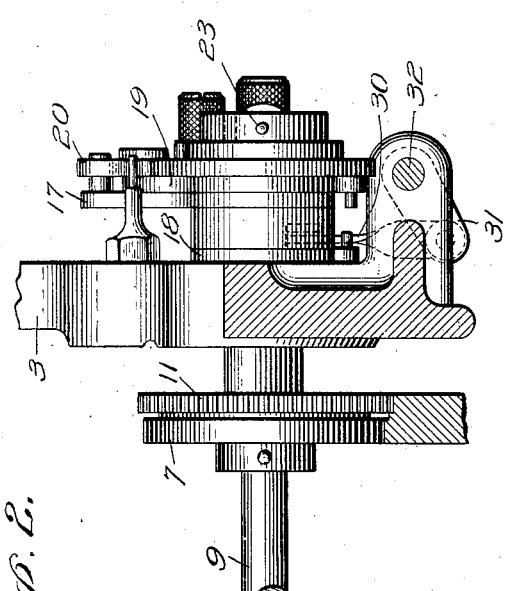
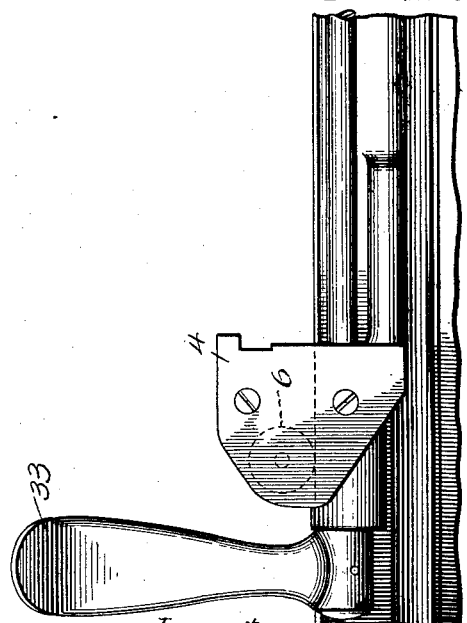
Witness:
F. C. Gibson.
Inventor:
Harry A. Foothorap.
By
Attorney May 31, 1932. H. A. FOOTHORAP 1,861,210
LINE SPACE MECHANISM FOR TYPEWRITING MACHINES
Filed April 4, 1929 2 Sheets-Sheet 2
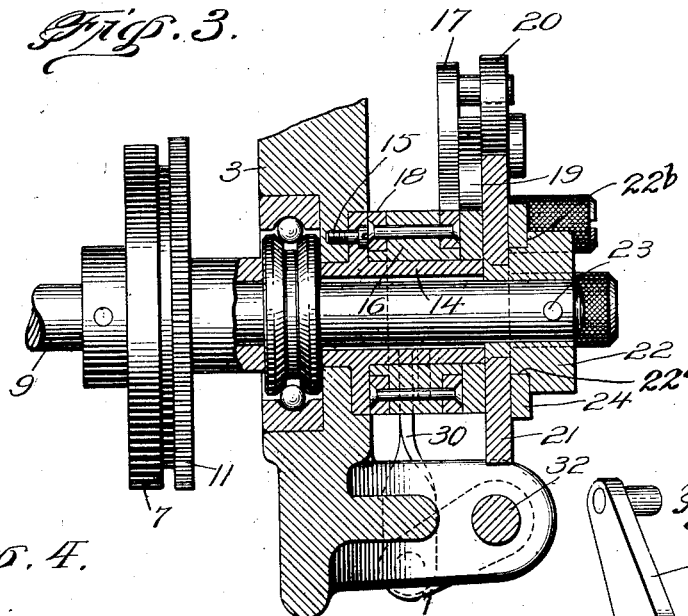
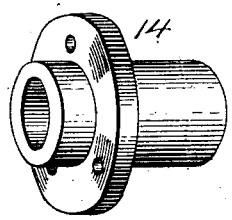
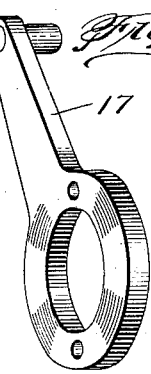
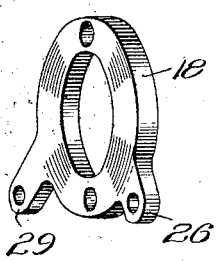
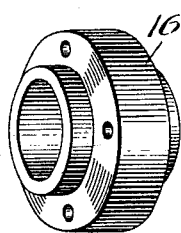
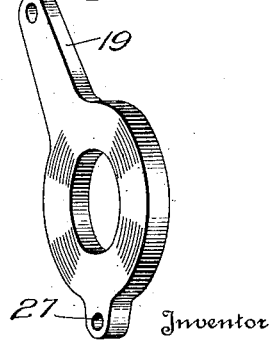
Inventor
Harry A. Foothorap.
Witness:
F. C. Gibson.
By
Attorney Patented May 31, 1932

1,861,210

UNITED STATES PATENT OFFICE

HARRY A. FOOTHORAP, OF HARRISBURG, PENNSYLVANIA, ASSIGNOR TO ELLIOTT-FISHER COMPANY, OF NEW YORK, N. Y., A CORPORATION OF DELAWARE

LINE SPACE MECHANISM FOR TYPEWRITING MACHINES

Original application filed March 25, 1927, Serial No. 178,349. Divided and this application filed April 4, 1929. Serial No. 352,488.

My invention relates to billing machines of the type known commercially as the Elliott-Fisher machine, and more particularly to improvements in line spacing mechanism for such machines.

In machines of this type the line spacing mechanism proper is mounted upon a line space shaft so that the shaft is used as a bearing for certain rotatably mounted elements of said mechanism. This shaft is one element of a truck mounting for a line space frame and is rotatable independently of operation of the line spacing mechanism when the line space frame is moved manually in a forward or reverse direction.

It is the particular object of my invention to provide for mounting the line spacing mechanism so that all the elements thereof, including the mounting, are out of contact with the line space shaft and at the same time the rotatable parts are movable concentrically about the shaft, with the end in view of eliminating frictional resistance against operation of the shaft and thus providing for easier operation of the carriage under all conditions.

Other and subordinate objects will appear during the course of the succeeding description.

In the accompanying drawings:

Figure 1 is a side elevation of a portion of an Elliott-Fisher machine including the line space frame, and embodying my invention, Figure 2 is a front elevation of the line spacing mechanism, Figure 3 is a sectional view through the line space spacing mechanism, Figure 4 is a detail perspective view of a bearing sleeve for the line spacing mechanism, Figure 5 is a detail view of a collar, Figure 6 is a similar view of a hub member, Figure 7 is a detail perspective view of the dog rocker of the line spacing mechanism, and Figure 8 is a similar view of a dog carrier.

The present application is a division of my copending application Serial No. 178,349, filed March 25, 1927, to which attention is directed for a more complete disclosure of such elements of an Elliott-Fisher billing machine as the line space frame, its mounting, and other parts not shown in detail in the present instance.

In the drawings 1 designates a portion of one of the side rails of an Elliott-Fisher billing machine which form a part of a stationary platen supporting frame and between which is mounted the usual platen, not shown. The numeral 2 designates the line space frame of the machine which comprises side brackets, one of which is shown at 3, and front and rear bars 4 and 5 respectively. The line space frame 2 is mounted upon the side rails 1, for movement back and forth over the platen, by means of front and rear rolls as at 6 and 7, respectively. As will be understood, a letter space carriage, indicated at 8, is suitably supported upon the bars 4 and 5 and printing mechanism, now shown, is mounted upon the letter space carriage. For a complete disclosure of such elements attention is directed to my Patent No. 1,421,201.

The rear rolls 7 are fast upon a line spacing shaft 9, having its ends journaled in the brackets 3 of the line space frame as shown at 10. The line spacing shaft 9 is geared to the side rails 1 by means of gears, one of which is shown at 11, fast on the shaft 9 and meshing with toothed racks 12 on the side rail 1.

In accordance with my present invention the line spacing mechanism, designated as a unit by the numeral 13, and which in its mode of operation is not novel, contemplates its removal from the shaft 9 which has ordinarily constituted the supporting or bearing element for the line spacing elements.

Instead of mounting these movable parts on said shaft I provide a fixed bearing sleeve 14 encircling the shaft 9, but free from contact therewith, and screwed or otherwise rigidly secured to one of the brackets 3 as indicated at 15. On this sleeve 14 rotates a hub 16, to which are fixed the dog rocker 17 and collar 18. Also mounted on the sleeve 14 is the dog carrier 19 on which is mounted the usual line space dog 20 arranged to engage a knurled line space wheel 21 swaged on a hub 22 which is pinned to the shaft 9 as indicated at 23. The diameter of the hub 22 is reduced as at 22a to provide a shoulder 22b adjacent to the outer side of the line space wheel 21, and receives the hub 24 of the usual line space stop lever 25 which is thereby confined on the hub 22 by said wheel 21. The line space stop lever 25, as will be understood, is adapted to limit the rearward throw of the line space dog 20 and is adjustable about the hub 22 to vary said throw of the line space dog, all as described in my Patent No. 1,275,413. The collar 18 and the dog carrier 17 are provided with lugs 26 and 27, respectively, for the connection of retracting springs such as shown at 28, and the collar 18 is provided with an additional lug 29 for the attachment of a link 30 extending from a crank 31 at the rear of the shaft 32 provided at the front end of the frame with a hand operated line space lever 33.

The mode of operation of this mechanism is ordinary and need not be described in detail, and it is thought that from the foregoing the improvements effected by me will be clearly understood, but I reserve the right to effect such modification of the illustrated structure as may come within the scope of the appended claims.

What I claim is:

1. The combination with a line space frame, a line space shaft, and a line space wheel fixed to the shaft, of a dog carrier lever, a dog rocker lever, and a mounting for said levers located intermediate the wheel and the frame, said mounting being free from contact with the shaft and supporting the dog carrier lever and the dog rocker lever for movement concentrically about said shaft.

2. The combination with a line space frame, a line space shaft, and a line space wheel fixed to the shaft, of a dog carrier lever, a dog rocker lever, and a mounting for said levers including a sleeve secured on the frame to encircle the shaft, said sleeve being free from contact with the shaft and supporting said levers for movement about said shaft.

In testimony whereof I have affixed my signature.

HARRY A. FOOTHORAP.